United States Patent
Takami et al.

(10) Patent No.: US 9,531,034 B2
(45) Date of Patent: Dec. 27, 2016

(54) NONAQUEOUS ELECTROLYTE BATTERY AND BATTERY PACK

(71) Applicant: Kabushiki Kaisha Toshiba, Minato-ku (JP)

(72) Inventors: Norio Takami, Yokohama (JP); Hiroki Inagaki, Yokohama (JP); Wen Zhang, Sagamihara (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 130 days.

(21) Appl. No.: 14/489,677

(22) Filed: Sep. 18, 2014

(65) Prior Publication Data

US 2015/0086841 A1    Mar. 26, 2015

(30) Foreign Application Priority Data

Sep. 20, 2013 (JP) .................. 2013-196130

(51) Int. Cl.
| | |
|---|---|
| *H01M 2/20* | (2006.01) |
| *H01M 10/0525* | (2010.01) |
| *H01M 4/66* | (2006.01) |
| *H01M 2/30* | (2006.01) |
| *H01M 4/485* | (2010.01) |

(52) U.S. Cl.
CPC .......... *H01M 10/0525* (2013.01); *H01M 2/30* (2013.01); *H01M 4/661* (2013.01); *H01M 4/662* (2013.01); *H01M 4/667* (2013.01); *H01M 4/485* (2013.01); *Y02E 60/122* (2013.01); *Y02T 10/7011* (2013.01)

(58) Field of Classification Search
CPC .... H01M 10/0525; H01M 4/667; H01M 2/30; H01M 4/662; H01M 4/661; H01M 4/485; Y02T 10/7011; Y02E 60/122
See application file for complete search history.

(56) References Cited

U.S. PATENT DOCUMENTS

| | | | |
|---|---|---|---|
| 2004/0166409 A1* | 8/2004 | Takada ............... | H01M 4/0421 429/218.1 |
| 2011/0195308 A1* | 8/2011 | Lee .................... | H01M 4/131 429/213 |

(Continued)

FOREIGN PATENT DOCUMENTS

| | | |
|---|---|---|
| JP | 2002-42889 | 2/2002 |
| JP | 2006-302616 | 11/2006 |

(Continued)

*Primary Examiner* — Cynthia K Walls
(74) *Attorney, Agent, or Firm* — Oblon, McClelland, Maier & Neustadt, L.L.P.

(57) ABSTRACT

According to one embodiment, a nonaqueous electrolyte battery including a positive electrode, a negative electrode, a separator, a copper-containing member, and a nonaqueous electrolyte is provided. The negative electrode includes a negative electrode current collector and a negative electrode active material-containing layer. The negative electrode current collector includes aluminum or aluminum alloy. The negative electrode active material-containing layer is formed on the negative electrode current collector. The copper-containing member includes copper or copper alloy. The copper-containing member is electrically connected to the negative electrode current collector to prevent from over-discharge.

9 Claims, 2 Drawing Sheets

(56) References Cited

U.S. PATENT DOCUMENTS

2013/0078500 A1     3/2013   Takami et al.
2013/0177817 A1*   7/2013   Noumi .................. H01G 11/52
                                                                         429/246

FOREIGN PATENT DOCUMENTS

| JP | 2008-140638 | | 6/2008 | | |
|---|---|---|---|---|---|
| JP | 2009-211936 | | 9/2009 | | |
| JP | 2012-22792 | | 2/2012 | | |
| JP | WO 2012/172619 | * | 12/2012 | .............. | H21M 2/16 |

* cited by examiner

NONAQUEOUS ELECTROLYTE BATTERY AND BATTERY PACK

CROSS-REFERENCE TO RELATED APPLICATIONS

This application is based upon and claims the benefit of priority from Japanese Patent Application No. 2013-196130, filed Sep. 20, 2013, the entire contents of which are incorporated herein by reference.

FIELD

Embodiments described herein relate generally to nonaqueous electrolyte battery and battery pack.

BACKGROUND

Nonaqueous electrolyte batteries using, as a negative electrode, a lithium metal, lithium alloy, a lithium compound or a carbon material are anticipated to be used as high energy density batteries or high output density batteries, and much research and development has taken place therefor. Lithium ion batteries have been put into practical use, such as in a positive electrode containing $LiCoO_2$ or $LiMn_2O_4$ as an active material and a negative electrode containing a carbon material capable of absorbing and releasing lithium.

Recently, use of a titanium oxide instead of a carbon material in the negative electrode has been studied, in terms of long cycle life, and high safety and reliability. When titanium oxide is used as a negative electrode active material, lithium is absorbed and released at a potential of 0.4 V (vs. $Li/Li^+$) or more in a negative electrode, and thus aluminum or aluminum alloy can be used for a current collector, thus advantageously resulting in realization of more weight saving and lower cost.

On the other hand, a polarity inversion phenomenon in which a negative electrode potential becomes higher than a positive electrode potential occurs upon over-discharge. In addition, when the over-discharge is continued, oxidative decomposition of an electrolytic solution occurs at the negative electrode and reductive decomposition of the electrolytic solution occurs at the positive electrode, thus resulting in occurrence of a problem in which a battery temperature is elevated due to continuous heat generation.

DETAILED DESCRIPTION

According to one embodiment, a nonaqueous electrolyte battery including a positive electrode, a negative electrode, a separator, a copper-containing member, and a nonaqueous electrolyte is provided. The negative electrode includes a negative electrode current collector including aluminum or aluminum alloy, and a negative electrode active material-including layer formed on the negative electrode current collector. The separator is disposed between the positive electrode and the negative electrode. The copper-containing member includes copper or copper alloy, and is electrically connected to the negative electrode current collector to prevent from over-discharge.

According to the embodiment, a battery pack including the nonaqueous electrolyte battery of the embodiment is also provided.

First Embodiment

According to a first embodiment, a nonaqueous electrolyte battery including a positive electrode, a negative electrode, a separator, a copper-containing member, and a nonaqueous electrolyte is provided. The negative electrode includes a negative electrode current collector and a negative electrode active material-including layer formed on the negative electrode current collector. The negative electrode active material-including layer includes aluminum or aluminum alloy. The separator is disposed between the positive electrode and the negative electrode. The copper-containing member includes copper or copper alloy, and is electrically connected to the negative electrode current collector to prevent from or control over-discharge.

When the nonaqueous electrolyte battery is in an overdischarged state and a negative electrode potential is 3.8 V (vs. $Li/Li^+$) or more relative to an Li potential, the copper-containing member turns into $Cu^{2+}$ ions, and causes an electrically oxidative dissolution. The $Cu^{2+}$ ions are reduced at the positive electrode to deposit a metal Cu at the positive electrode. As a result, internal short-circuit occurs due to the deposited metal Cu, a battery voltage reaches 0 V, and electric current to the positive electrode and the negative electrode is regulated, whereby the heat generation is suppressed in the battery. In addition, oxidation-reduction reaction of Cu occurs preferentially, and thus the decomposition reaction of the nonaqueous electrolyte is suppressed, and gas generation and heat generation in the battery, caused by the decomposition reaction, are suppressed. From the foregoing, a nonaqueous electrolyte battery, in which temperature increase is suppressed upon over-discharge and high safety can be realized even if a circuit for preventing over-discharge is not used, can be provided, because gas generation and heat generation can be suppressed upon over-discharge. In addition, when the negative electrode potential is 3.8 V (vs. $Li/Li^+$) or more relative to the Li potential, the copper-containing member starts operation, and thus it is possible to suppress the heat generation due to the over-discharge more quickly than in a case where electric breakage takes place due to Joule heat generated by current flowing during the over-discharge.

The separator may be provided between the positive electrode and the negative electrode, and between the positive electrode and the copper-containing member. The copper-containing member is desirably provided so as to face the positive electrode through the separator. This can promote a reaction in which $Cu^{2+}$ ions are reduced at the positive electrode upon the over-discharge, and thus a dissolution reaction of Cu or Cu alloy can be smoothly advanced, and the oxidative decomposition reaction of the nonaqueous electrolyte can be suppressed. As a result, the temperature increase can be further suppressed upon the over-discharge.

It is desirable that the nonaqueous electrolyte battery further includes a negative electrode terminal, which is electrically connected to the negative electrode, and the copper-containing member also serves as a lead which electrically connects the negative electrode current collector to the negative electrode terminal. This makes parts of the nonaqueous electrolyte battery more compact, and thus a high energy density can be obtained.

The negative electrode active material-including layer preferably includes a metal oxide including titanium. In the metal oxide including titanium, the lithium absorption/release potential is 0.4 V (vs. Li/Li$^+$) or more at the negative electrode, and thus an alloying reaction of aluminum with lithium in the negative electrode current collector, and pulverization of the negative electrode current collector can be suppressed. In addition, the titanium-containing oxide shows a high electron conductivity in a battery voltage area usually used (e.g., from 4.2 to 2.5 V), and thus the input/output performance can be further improved. This enables to obtain a nonaqueous electrolyte battery having an excellent input/output performance and excellent charge and discharge cycle performance.

The battery of the embodiment may further include a container, which contains the positive electrode, the negative electrode, the separator, the copper-containing member, and the nonaqueous electrolyte. The container can be provided with an external positive electrode terminal and an external negative electrode terminal. The negative electrode, the copper-containing member, the positive electrode, the separator, the nonaqueous electrolyte, the container, the external positive electrode terminal, and the external negative electrode terminal will be explained below.

1) Negative Electrode

The negative electrode has a negative electrode current collector, and a negative electrode material layer (a negative electrode active material-containing layer) which is carried on one side or both sides of the negative electrode current collector and includes a negative electrode active material. The negative electrode may include a negative electrode current collecting tab. As the negative electrode current collecting tab, for example, a part where the negative electrode material layer is not formed on the negative electrode current collector may be used.

It is desirable that the negative electrode current collector is an aluminum foil or an aluminum alloy foil. The negative electrode current collector has a thickness of preferably 20 μm or less. The lower limit of the thickness of the negative electrode current collector is desirably 5 μm.

The aluminum foil has a purity of preferably 99% by mass or more, more preferably 99.99% by mass or more. A preferable aluminum alloy includes at least one element selected from the group consisting of magnesium, zinc, manganese and silicon. On the other hand, it is preferable to control a content of a transition metal which is at least one metal selected from the group consisting of iron, copper, nickel, and chromium to 100 mass ppm or less.

The negative electrode current collector has desirably an average crystal particle size of 50 μm or less. In this range, the negative electrode current collector has high strength, making it possible to withstand a strong load which is applied to the negative electrode including the negative electrode active material having an average particle size of 1 μm or less when the negative electrode is pressed.

An open circuit potential at which lithium ions are absorbed or released in the negative electrode active material is preferably 0.4 V (vs. Li/Li$^+$) or more relative to an open circuit potential of the lithium metal. In this range, the alloying reaction between the aluminum included in the negative electrode current collector and the lithium, and pulverization of the negative electrode current collector can be suppressed. The open circuit potential at which the lithium ions are absorbed or released is more preferably within a range of 0.4 V to 3 V (vs. Li/Li$^+$) relative to the open circuit potential of the lithium metal. In this range, the battery voltage can be improved.

Examples of the negative electrode active material having the open circuit potential at which the lithium ions are absorbed or released of 0.4 V (vs. Li/Li$^+$) or more relative to the lithium metal open circuit potential may include metal oxides, metal sulfides, metal nitrides, alloy, and the like. The negative electrode active material may be used in one kind, or two or more kinds.

Examples of the metal oxide may include tungsten oxide ($WO_3$), amorphous tin oxides (such as $SnB_{0.4}P_{0.6}O_{3.1}$), tin silicon oxides (such as $SnSiO_3$), silicon oxide (SiO), metal oxides including titanium, niobium oxide, niobium titanium oxide, and the like. Of these, metal oxides including titanium (hereinafter referred to as "titanium-containing oxide") are preferable.

Examples of the titanium-containing oxide may include titanium oxide and lithium titanium oxide. The titanium oxide can be represented by the general formula: $Li_aTiO_2$ (0≤a≤2). In this case, the composition formula thereof before charge is $TiO_2$. Examples of the titanium oxide may include titanium oxides having a monoclinic system or bronze structure (B) and titanium oxides having an anatase structure. The $TiO_2$ (B) having the bronze structure (B) is preferable, and a low crystalline $TiO_2$ which has been heat-treated at a temperature of 300 to 600° C., is preferable. Examples of the lithium titanium oxide may include lithium titanium oxides having a spinel structure (such as oxide represented by the general formula: $Li_{4/3+a}Ti_{5/3}O_4$ (0≤a≤2)), lithium titanium oxides having a ramsdellite structure (such as oxide represented by the general formula: $Li_{2+a}Ti_3O_7$ (0≤a≤1), $Li_{1+b}Ti_2O_4$ (0≤b≤1), $Li_{1.1+b}Ti_{1.8}O_4$ (0≤b≤1), or $Li_{1.07+b}Ti_{1.86}O_4$ (0≤b≤1)), lithium titanium-containing composite oxides including at least one element selected from the group consisting of Nb, Mo, W, P, V, Sn, Cu, Ni and Fe, and the like. The preferable examples include titanium oxide having a monoclinic system or bronze structure (B) and the titanium oxide having the anatase structure, because a high capacity can be obtained at a low potential. Lithium titanate having the spinel structure, whose volume change is low, is preferable in terms of the cycle performance.

Examples of the niobium titanium oxide may include oxides represented by the general formula: $Li_cNb_dTiO_7$ (0≤c≤5, and 1≤d≤4), and the like.

Examples of the metal sulfide may include lithium sulfide ($TiS_2$), molybdenum sulfide ($MoS_2$), iron sulfides (FeS, $FeS_2$, $Li_xFeS_2$ (0≤x≤4), and the like.

Examples of the metal nitride may include lithium cobalt nitrides ($Li_xCo_yN$, 0<x<4 and 0<y<0.5), and the like.

The negative electrode active material may be in any state of primary particles, secondary particles of aggregated primary particles, and a mixture of primary particles and secondary particles. The negative electrode active material includes preferably particles whose average particle size of the primary particle is 1 μm or less. In this case, the negative electrode active material can quickly absorb and release lithium ions, and a nonaqueous electrolyte battery can provide a high input/output performance; as a result, an optimum secondary battery for vehicles can be realized. The cycle performance of the battery can also be improved. In particular, this effect can be remarkably exhibited at the time when rapid charge is performed, under a low temperature atmosphere, and at the time when high output discharge is performed. This is because, for example, in a case of the negative electrode active material absorbing or releasing lithium ions, the smaller the particle size, the shorter the diffusion path of the lithium ion inside the active material, which results in a higher specific surface area thereof. The average particle size is more preferably 0.3 µm or less. The lower limit of the average particle size is preferably 0.05 µm.

Regarding the titanium-containing oxide, when the average particle size of the primary particle is 1 µm or less, a nonaqueous electrolyte battery whose resistance is low and whose heat generation is little upon over-discharge can be provided.

Regarding the negative electrode active material, the primary particles having an average particle size of 1 µm or less are obtained, for example, by reacting an active material starting material to synthesize an active material precursor powder whose particle size is 1 µm or less, followed by pulverizing the active material precursor powder, which has been subjected to a sintering treatment, in a pulverizer such as a ball mill or a jet mill into a particle size of 1 µm or less.

The particle size of the negative electrode active material is measured, for example, using a laser diffraction particle size distribution measuring apparatus (Shimadzu SALD-300), according to a method in which 0.1 g of a sample, a surfactant, and 1 to 2 mL of distilled water are added to a beaker, the mixture is thoroughly stirred, the resulting mixture is poured into a stirring water tank, a light intensity distribution is measured 64 times at an interval of 2 seconds, and analysis of particle size distribution data is performed.

The negative electrode material layer may include a conductive agent. As the conductive agent, a carbon-containing material may be used. Examples thereof may include acetylene black, carbon black, coke, carbon fiber, graphite, and the like. The conductive agent may be used in one kind, or two or more kinds.

The negative electrode material layer may include a binder. The binder may include, for example, polytetrafluoroethylene (PTFE), polyvinylidene fluoride (PVdF), fluorine-containing rubber, styrene-butadiene rubber, and the like. The binder may be used in one kind, or two or more kinds.

The blending ratio of the negative electrode active material, the conductive agent, and the binder is preferably set to a range of 80 to 95% by weight of the negative electrode active material, 3 to 18% by weight of the conductive agent, and 2 to 7% by weight of the binder.

The negative electrode is produced, for example, by suspending the negative electrode active material, the conductive agent, and the binder in an appropriate solvent, and coating the resulting suspension on the current collector, and drying and pressing it.

2) Copper-Containing Member

It is enough that the copper-containing member is electrically connected to at least one part of the negative electrode current collector, the negative electrode material layer and the negative electrode current collecting tab. The electrical connection method of the copper-containing member to the negative electrode is not particularly limited, but when the electrical connection is insufficient, the resistance becomes large, and heat generation occurs frequently inside the battery. For this reason, ultrasonic bonding is preferable. When this bonding method is used, a bonding strength at the bonded interface can be kept high, and the electric resistance can be reduced.

It is desirable to bring the copper-containing member into contact with the nonaqueous electrolyte. In such a case, an electrochemically oxidative dissolution reaction to $Cu^{2+}$ ions can be promoted upon the over-discharge. In order to sufficiently bring the nonaqueous electrolyte into contact with the copper-containing member, it is desirable that the nonaqueous electrolyte is in the state of a liquid or a gel.

The copper-containing member can also serve as the lead for electrically connecting the negative electrode to the external negative electrode terminal. The lead is preferably a metal foil or metal plate including copper or copper alloy. In order to secure flexibility, it is desirable to set the thickness of the lead to a range of 0.1 to 1 mm. The lead is desirably electrically connected to the negative electrode current collector through welding or ultrasonic bonding.

The separator may be provided between the positive electrode and the negative electrode, and between the positive electrode and the copper-containing member. It is desirable that the copper-containing member is provided so as to face the positive electrode through the separator. It is desirable that at least one part of the positive electrode current collector, the positive electrode current collecting tab, and the positive electrode material layer faces the copper-containing member in a state in which the separator is provided between the copper-containing member and the at least one part. In such a case, the copper-containing member faces the positive electrode in a state in which the copper-containing member is brought into contact with the nonaqueous electrolyte held in the separator, and thus the dissolution reaction of Cu or Cu alloy can be advanced smoothly, and the oxidative decomposition reaction of the nonaqueous electrolyte can be suppressed.

The copper and the copper alloy have each a Cu purity of 99% by mass or more. In this range, electrochemically oxidative dissolution to $Cu^{2+}$ ions can be promoted upon over-discharge.

The copper has preferably a purity of 99.9% by mass or more. The copper alloy has preferably a purity of 99 to 99.6% by mass. Examples of the copper alloy may include an alloy including one or more elements selected from the group consisting of Fe, Si, Cr, Sn, Zr, Zn, Pb and Bi in a content of 0.7% by mass or less, an alloy including a metal capable of easily electrically dissolved at a potential of 3.5 V (vs. $Li/Li^+$) or more relative to the lithium potential, and the like.

3) Positive Electrode

The positive electrode includes a positive electrode current collector, and a positive electrode material layer (a positive electrode active material-including layer) which is carried on one side or both sides of the positive electrode current collector and includes a positive electrode active material. The positive electrode may include a positive electrode current collecting tab. As the positive electrode current collecting tab, for example, a part of the positive electrode current collector may be used. The part is a portion where the positive electrode material layer is not formed on.

Examples of the positive electrode current collector may include an aluminum foil or an aluminum alloy foil, and the positive electrode current collector has a thickness of preferably 20 µm or less. The lower limit of the thickness of the positive electrode current collector is desirably 5 µm.

The aluminum foil has a purity of preferably 99% by mass or more, more preferably 99.99% by mass or more. A preferable aluminum alloy includes at least one element selected from the group consisting of magnesium, zinc, manganese and silicon. On the other hand, it is preferable to control a content of a transition metal which is at least one metal selected from the group consisting of iron, copper, nickel, and chromium to 100 mass ppm or less.

Examples of the positive electrode active material may include oxides, sulfides, polymers, and the like. The positive electrode active material may be used in one kind, or two or more kinds.

Examples of the oxide may include manganese dioxide ($MnO_2$), iron oxide, copper oxide, nickel oxide, lithium manganese composite oxides (such as $Li_xMn_2O_4$ or $Li_xMnO_2$), lithium nickel composite oxides (such as $Li_xNiO_2$), lithium cobalt composite oxides (such as $Li_xCoO_2$), lithium nickel cobalt composite oxides (such as $LiNi_{1-y}Co_yO_2$), lithium nickel manganese cobalt composite oxides (such as $Li_xNi_2Mn_yCo_{1-z-y}O_2$), spinel type lithium manganese nickel composite oxides (such as $Li_xMn_{2-y}Ni_yO_4$), lithium phosphorus oxides having an olivine structure (such as $Li_xFePO_4$, $Li_xFe_{1-y}Mn_yPO_4$, and $Li_xCoPO_4$), fluorosulfate (such as $LiFeSO_4F$), vanadium oxide (such as $V_2O_5$), and the like.

The polymer may include, for example, electric conductive polymer materials such as polyaniline or polypyrrol, and disulfide polymer materials. In addition, sulfur (S), fluorinated carbon, and the like can also be used.

Preferable positive electrode active materials may include lithium manganese composite oxides, lithium nickel composite oxides, lithium cobalt composite oxides, lithium nickel cobalt composite oxides, spinel type lithium manganese nickel composite oxides, lithium manganese cobalt composite oxides, fluorosulfates containing lithium and iron, lithium nickel cobalt manganese composite oxides having a layered crystal structure, and the like, because a high battery voltage can be obtained therefrom. X, y and z are preferably within a range of $0<x<1$, $0<y<1$, and $0<z<1$ unless otherwise indicated.

The composition of the lithium nickel manganese composite oxide is preferably represented by the formula: $Li_aNi_bCo_cMn_dO_2$ wherein molar ratios a, b, c and d are: $0<a\leq1.1$, $0.1\leq b\leq0.8$, $0\leq c\leq0.9$, and $0.1\leq d\leq0.5$).

The positive electrode material layer may include a conductive agent. The conductive agent may include, for example, acetylene black, carbon black, graphite, and the like. The conductive agent may be in one kind, or two or more kinds.

The positive electrode material layer may include a binder. The binder may include, for example, polytetrafluoroethylene (PTFE), polyvinylidene fluoride (PVdF), fluorine-containing rubber, and the like. The binder may be used in one kind, or two or more kinds.

The blending ratio of the positive electrode active material, the conductive agent, and the binder is preferably within a range of 80 to 95% by weight of the positive electrode active material, 3 to 18% by weight of the conductive agent, and 2 to 7% by weight of the binder.

The positive electrode is produced, for example, by suspending the positive electrode active material, the conductive agent, and the binder in a solvent, coating the resulting suspension on the aluminum foil or aluminum alloy foil current collector, and drying and pressing it.

It is desirable that the positive electrode current collector is electrically connected to the positive electrode lead. The positive electrode lead can be formed, for example, from aluminum or aluminum alloy.

4) Separator

Examples of the separator may include porous films of an olefin such as polyethylene (PE) or polypropylene (PP), cellulose fiber separators, synthetic resin nonwoven fabrics, aramid porous films, and the like. The shape of the separator may include a nonwoven fabric, film, paper, or the like. The separator has preferably a porosity of 50% or more. The cellulose fiber separators having a porosity of 60% or more have an excellent ability to impregnate the electrolyte, and exhibit a high output performance from a low temperature to a high temperature. The more preferable range thereof is from 62% to 80%.

When the diameter of a fiber forming the separator is 10 μm or less, an affinity between the nonaqueous electrolyte and the separator is improved, thus resulting in reduced battery resistance. The diameter is more preferably 3 μm or less.

The separator has preferably a thickness of 20 to 100 μm and a density of 0.2 to 0.9 g/cm³. When the thickness is within the range described above, mechanical strength and the reduced battery resistance can be balanced well, and a battery which has a high output and in which it is difficult to cause an internal short-circuit can be provided. In addition, a thermal shrinkage is small in a high temperature atmosphere, and an excellent storage performance can be exhibited at a high temperature.

5) Nonaqueous Electrolyte

The nonaqueous electrolyte may include a liquid nonaqueous electrolyte prepared by dissolving an electrolyte in an organic solvent, gelatinous nonaqueous electrolyte prepared by combining the liquid electrolyte with a polymeric material, and solid nonaqueous electrolyte prepared by combining an electrolyte of a lithium salt with a polymeric material. A room temperature molten salt including a lithium ion (an ionic melt) may also be used.

The liquid nonaqueous electrolyte is prepared, for example, by dissolving the electrolyte in an organic solvent in a content of 0.5 to 2 mol/L.

Examples of the electrolyte may include, for example, $LiBF_4$, $LiPF_6$, $LiAsF_6$, $LiClO_4$, $LiCF_3SO_3$, $LiN(CF_3SO_2)_2$, $LiN(C_2F_5SO_2)_2$, $Li(CF_3SO_2)_3C$, $LiB[(OCO)_2]_2$, and the like. The electrolyte used may be used in one kind, or two or more kinds.

The organic solvent may include, for example, cyclic carbonates such as propylene carbonate (PC) or ethylene carbonate (EC); chain carbonates such as diethyl carbonate (DEC), dimethyl carbonate (DMC), or methyl ethyl carbonate (MEC); chain ethers such as dimethoxyethane (DME) or diethoxyethane (DEE); cyclic ethers such as tetrahydrofuran (THF) or dioxolane (DOX), γ-butyrolactone (GBL), acetonitrile (AN), sulfolane (SL), and the like. They may be used alone or as a mixed solvent.

The polymeric material may include, for example, polyvinylidene fluoride (PVdF), polyacrylonitrile (PAN), polyethyleneoxide (PEO), and the like.

The room temperature molten salt (ionic melt) includes a lithium ion, an organic cation, and an organic anion, and is in the state of a liquid at a temperature of 100° C. or less, preferably at room temperature.

6) Container

For the container, for example, a metal container or a laminate film container may be used.

As the metal container, a container formed from aluminum, aluminum alloy, iron, or stainless steel may be used, whose shape may be square or cylindrical. The container has a plate thickness of desirably 0.5 mm or less, more preferably 0.3 mm or less. It is preferable to use aluminum or aluminum alloy in terms of the weight reduction and corrosion resistance. As the aluminum alloy, an alloy including at least one metal component selected from the group consisting of Mg, Mn and Fe. When such an alloy is used, the strength of the container is further enhanced, and it is possible to make the wall thickness thinner, such as 0.3 mm or less.

As the laminate film, a film having a layered structure including a metal layer and a resin layer is desirable. Examples thereof may include a laminate film including an aluminum foil and a resin film formed on at least one side of the aluminum foil, and the like. As the resin, a polymer such as polypropylene (PP), polyethylene (PE), nylon, or polyethylene terephthalate (PET) can be used. The laminate film has preferably a thickness of 0.2 mm or less. The aluminum foil has preferably a purity of 7) External Terminal The external terminal includes a positive electrode external terminal and a negative electrode external terminal. The external terminal may be electrically connected by directly providing it on the container. The external terminal may also be electrically connected to an electrode through the lead. The position of the external terminal, accordingly, is not particularly limited, and it may be provided on any part of the container.

The external terminal includes an aluminum alloy including at least one metal component selected from the group consisting of Mg, Cu, Si, Mn, Cr and Fe, and having an aluminum purity of less than 99% by mass. The aluminum alloy including such a metal component has further improved strength and corrosion resistance, compared to those of aluminum or aluminum alloy having a high purity (99% by mass or more), and corrosion is advanced slowly even in a high temperature and high humidity atmosphere, and such alloy can keep the connection resistance to another battery small. The aluminum alloy includes more preferably at least one metal component selected from the group consisting of Mg (0.5 to 5% by mass), Fe (1% by mass or less), Cu (5% by mass or less) and Si (1% by mass or less). When such aluminum alloy is used, weldability of the positive and negative electrode leads with the copper-containing member is improved, and breakage of a wire due to vibration or shock can be suppressed, and high reliability can be secured. In a case of a battery module, increased resistance in the connection between batteries, caused by corrosion in a high temperature and high humidity atmosphere, can be suppressed, and thus the resistance can be kept low and the batteries and the battery module can exhibit a high output.

The external terminal is preferably in the shape of a bolt having a diameter of 3 to 30 mm.

Figure 1:
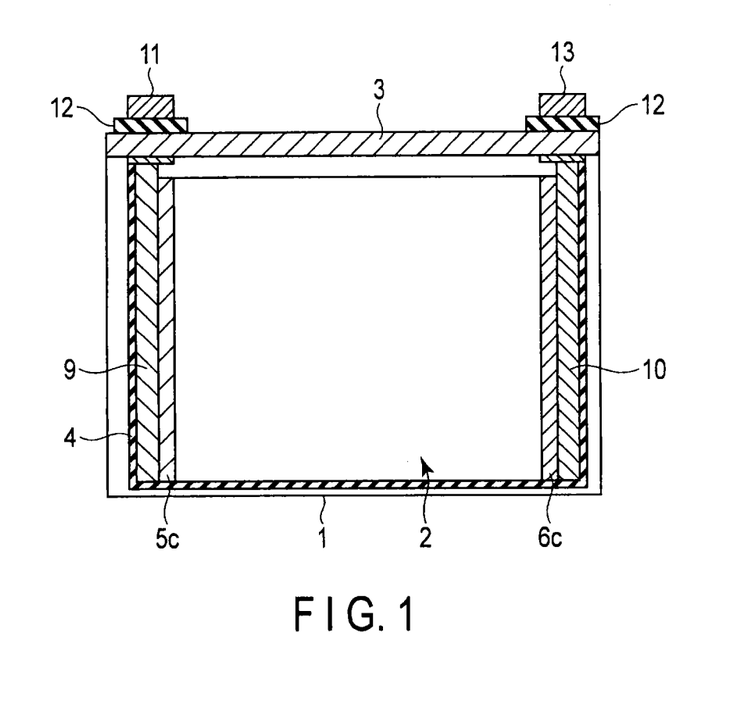
FIG. 1 is a partial cross-sectional view showing a nonaqueous electrolyte battery according to an embodiment.
Figure 2:
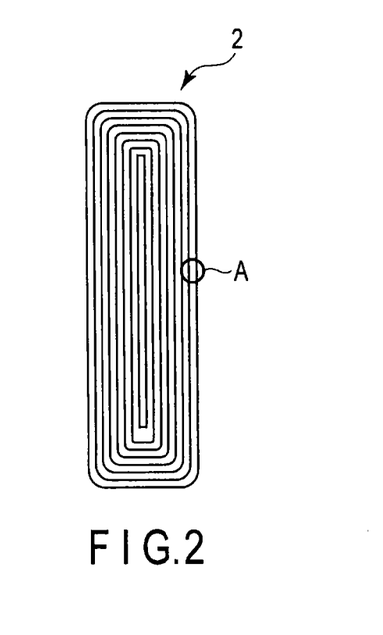
FIG. 2 is a cross-sectional view showing an electrode group of the battery in FIG. 1 cut in a diameter direction.
Figure 3:
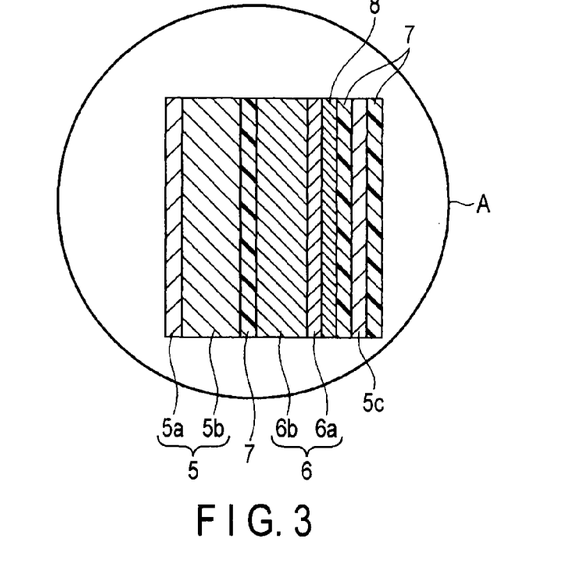
FIG. 3 is an enlarged cross-sectional view showing an A part in FIG. 2.

The square nonaqueous electrolyte battery according to the first embodiment is shown in FIG. 1 to FIG. 3. As shown in FIG. 1, the battery has a rectangular cylindrical metal container 1, an electrode group 2 contained in the container, a metal sealing plate 3, and an insulating layer 4 interposed between an inside of the container 1 and the electrode group 2. The nonaqueous electrolyte (not shown) is held in the electrode group 2. The sealing plate 3 is fixed on an opening of the container 1 by welding, or the like.

As shown in FIG. 2 and FIG. 3, the electrode group 2 includes a positive electrode 5, a negative electrode 6, a separator 7 disposed between the positive electrode 5 and the negative electrode 6 and a copper-containing member 8, and has a spirally wound, flat structure. The positive electrode 5 includes a positive electrode current collector 5a, and positive electrode material layers 5b formed on both sides of the positive electrode current collector 5a. The negative electrode 6 includes a negative electrode current collector 6a, and negative electrode material layers 6b formed on both sides of the negative electrode current collector 6a. The electrode group 2 has an outermost periphery formed of the separator 7. As shown in FIG. 1, at one edge face of the electrode group 2, the spirally wound, flat positive electrode current collector 5a protrudes from the separator 7 of the outermost periphery, and the protruding part serves as a positive electrode current collecting tab 5c. On the other hand, at the other edge face of the electrode group 2, the spirally wound, flat negative electrode current collector 6a protrudes from the separator 7 of the outermost periphery, and the protruding part serves as a negative electrode current collecting tab 6c.

FIG. 3 shows the layered structure of the edge face of the electrode group 2, observed from the side at which the positive electrode current collector 5a protrudes. The separator 7 of the outermost periphery, the positive electrode current collecting tab 5c, the separator 7, the copper-containing member 8, the negative electrode current collector 6a, the negative electrode material layer 6b, the separator 7, the positive electrode material layer 5b and the positive electrode current collector 5a are laminated in this order from the right side in FIG. 3. The members other than the separator 7 of the outermost periphery and the positive electrode current collecting tab 5c are located on the same plane. The separator 7 of the outermost periphery and the positive electrode current collecting tab 5c protrude from the plane toward this side of the drawing. In the electrode group 2, the negative electrode 6 is located outward from the positive electrode 5, and thus the positive electrode 5 does not face the outer surface of the outermost periphery of the negative electrode 6. In the outermost periphery of the negative electrode 6, the negative electrode material layer 6b is formed only on one side (inner surface) of the negative electrode current collector 6a. The copper-containing member 8 is a foil or has a plate shape, and is welded to the surface of the negative electrode current collector 6a of the outermost periphery in the negative electrode 6, whereby it is electrically connected to the negative electrode current collector 6a. The copper-containing member 8 faces the positive electrode current collecting tab 5c through the separator 7.

As shown in FIG. 1, the external positive electrode terminal 11 and the external negative electrode terminal 13 are each provided on the sealing plate 3 through insulating materials 12. On end of the strip-shaped positive electrode lead 9 is electrically connected to the positive electrode current collecting tab 5c, and the other end thereof is electrically connected to the external positive electrode terminal 11. On the other hand, one end of the strip-shaped negative electrode lead 10 is electrically connected to the negative electrode current collecting tab 6c, and the other end thereof is electrically connected to the external negative electrode terminal 13.

In FIG. 1, the copper-containing member 8 is electrically connected to a part of the negative electrode current collector 6a where the negative electrode material layer 6b is not formed, but the embodiment is not limited thereto, and it is also possible to form the negative electrode lead 10 from the copper-containing member.

The kind of the battery is not limited to the square type, and the battery may be formed into various kinds such as a cylinder type, a thin type, and a coin type. The shape of the electrode group is not limited to a flat shape, and it can be formed into, for example, a cylindrical shape, laminated shape, or the like.

According to the nonaqueous electrolyte battery of the first embodiment, as described above, the nonaqueous electrolyte battery can be provided which can suppress temperature increase upon over-discharge and can realize high safety even if a circuit for preventing the over-discharge is not used, because the battery includes the copper-containing member, which is electrically connected to the negative electrode current collector to be able to prevent from or control over-discharge and is formed of copper or a copper alloy.

Second Embodiment

A battery pack according to a second embodiment includes one or more nonaqueous electrolyte batteries according to the first embodiment. The battery pack may include a battery module formed of multiple batteries. The batteries may be connected to each other in series or in parallel, but series connections, and n multiples (n is an integer of 1 or more) of 6 series connections are preferable.

Figure 4:
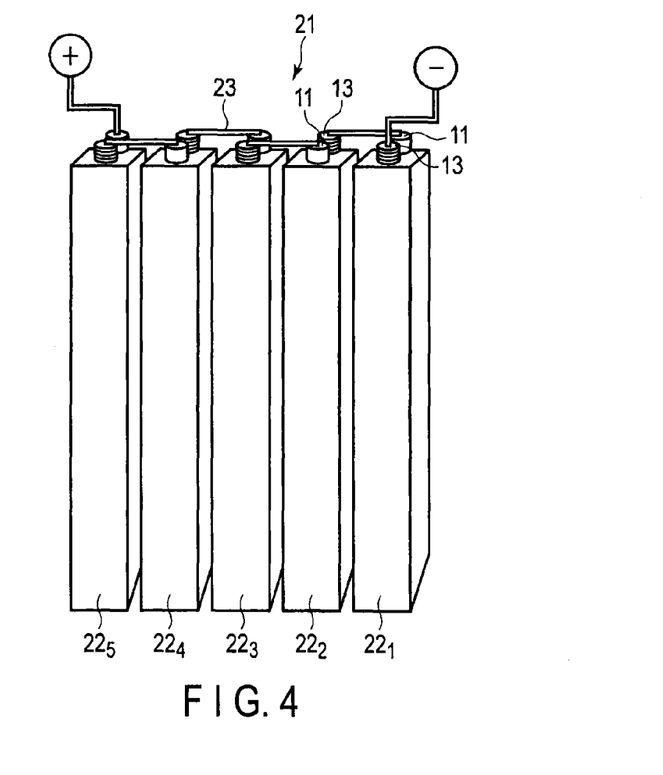
FIG. 4 is a perspective view showing one example of a battery module used in a battery pack according to an embodiment.

One embodiment of a battery module used for a battery pack is shown in FIG. 4. A battery module 21 shown in FIG. 4 includes multiple square type batteries $22_1$ to $22_5$ according to the first embodiment. An external positive electrode terminal 11 of the battery $22_1$ is electrically connected to an external negative electrode terminal 13 of the battery $22_2$, which is adjacent to the battery $22_1$, through a lead 23. Furthermore, an external positive electrode terminal 11 of the battery $22_2$ is electrically connected to the external negative electrode terminal 13 of a battery $22_3$, which is adjacent to the battery $22_2$, through a lead 23. The batteries $22_1$ to $22_5$ are connected in series in this way.

A metal can formed from aluminum alloy, iron, or stainless steel, or a plastic container may be used as a case for containing the battery module. The container has desirably a plate thickness of 0.5 mm or more.

An embodiment of the battery pack is altered appropriately depending on the use thereof. It is preferable for the use of the battery pack to require a cycle performance with a large current. Specifically, the use may include the use of a power source for a digital camera, or the use for cars such as two- to four-wheel hybrid electric cars, two- to four-wheel electric cars, and assist bicycles. The use for cars is preferable.

The battery pack may include a charge/discharge control circuit. In order to further improve the certainty of over-discharge prevention, the pack can also include a circuit for preventing over-discharge.

According to the second embodiment, the battery pack whose temperature increase is suppressed upon over-discharge and which has high safety can be realized, because it includes the nonaqueous electrolyte battery according to the first embodiment.

EXAMPLE

Examples of the present invention will be described in detail below. The embodiments are not limited to the Examples described below without departing from the gist of the invention.

Example 1

A method for producing a negative electrode is described. Lithium titanate ($Li_4Ti_5O_{12}$) having an average primary particle size of 0.5 μm, a specific surface area, according to a BET method with $N_2$ gas adsorption, of 10 $m^2/g$, and a spinel structure, as an active material, a carbon powder having an average particle size of 4 μm, as a conductive agent, and polyvinylidene fluoride (PVdF) as a binder were blended in a weight ratio of 90:7:3, and the mixture was dispersed in an n-methyl pyrrolidone (NMP) solvent to prepare a slurry. The obtained slurry was coated on an aluminum alloy foil having a thickness of 15 μm and a composition shown in Table 1 and dried, and a negative electrode (a width of the coated part of 94 mm) having an electrode density of 2.2 $g/cm^3$ was produced through a press step.

A method for producing a positive electrode is described. Lithium nickel cobalt manganese oxide ($LiNi_{0.5}Co_{0.2}Mn_{0.3}O_2$) as an active material, a graphite powder as a conductive material, polyvinylidene fluoride (PVdF) as a binder were blended in a weight ratio of 87:8:5, and the mixture was dispersed in an n-methyl pyrrolidone (NMP) solvent to prepare slurry. The obtained slurry was coated on an aluminum alloy foil having a thickness of 15 μm and a purity of 99% by mass and dried, and a positive electrode (with a width of the coated part of 92 mm) having an electrode density of 3.3 $g/cm^3$ was produced through a press step.

Next, the positive electrode and the negative electrode were spirally wound while a porous polyethylene film, which was a separator, having a thickness of 12 μm was interposed to produce a wound electrode group, which was subjected to a press molding, thereby producing a wound electrode group having a thickness of 19 mm, a width of 95 mm, and a height of 112 mm. An outermost periphery of the obtained electrode group was formed of the separator. In one edge face of the electrode group, the spirally wound, flat positive electrode current collector protrudes from the separator of the outermost periphery, and the protruding part serves as a positive electrode current collecting tab. On the other hand, in the other edge face of the electrode group, the spirally wound, flat negative electrode current collector protrudes from the separator of the outermost periphery, and the protruding part serves as a negative electrode current collecting tab.

A negative electrode lead formed of a copper plate having a thickness of 200 μm, a width of 20 mm, and a height of 95 mm, and having a composition shown in Table 1 was prepared. The negative electrode lead was bonded to the negative electrode current collecting tab with ultrasonic waves. In addition, the negative electrode lead was electrically connected to a bolt-shaped external negative electrode terminal formed of aluminum alloy (purity: including 98% by mass of Al, 1% by mass of Mg, 0.6% by mass of Si, 0.25% by mass of Cu, and inevitable impurities as the rest) having a diameter of 10 mm.

As the positive electrode lead, an aluminum plate (a purity of 99.9% by mass) having a thickness of 200 μm, a width of 20 mm, and a height of 95 mm was used. The positive electrode lead was electrically connected to the positive electrode current collecting tab. In addition, the positive electrode lead was electrically connected to a bolt-shaped external positive electrode terminal formed of an aluminum alloy (purity: including 98% by mass of Al, 1% by mass of Mg, 0.6% by mass of Si, 0.25% by mass of Cu, and inevitable impurities as the rest) having a diameter of 10 mm.

As the container, an aluminum alloy container (purity: including 96.5% by mass of Al, 1% by mass of Mn, 1.6% by mass of Mg, 0.4% by mass of Fe, and inevitable impurities as the rest) having a wall thickness of 0.5 mm was used.

The electrode group was contained in the container. A lithium salt, $LiPF_6$, was dissolved in a mixed organic solvent of PC and DEC (a volume ratio of 1:2) in a concentration of 1 mol/L to prepare a nonaqueous electrolytic solution, and the resulting solution was injected into the container, whereby a square nonaqueous electrolyte secondary battery having a structure shown in FIG. 1, having a thickness of 22 mm, a width of 115 mm, and a height of 103 mm, and having a discharge capacity of 20 Ah was produced. The internal resistance of the battery was 1 mΩ as a resistance value at a 1 kHz AC impedance.

Examples 2 to 7

Nonaqueous electrolyte secondary batteries having the same structure as in that in Example 1 described above were produced except that compositions of the negative electrode lead, the negative electrode current collector and the negative electrode active material are changed to those shown in Table 1 below.

Example 8

As the copper-containing member, a copper foil having a thickness of 50 μm, a width of 90 mm, and a height of 80 mm, and having a composition shown in Table 1 below was prepared. As shown in FIG. 3, the copper-containing member was bonded to an outer surface (the negative electrode current collector) of the outermost periphery of the negative electrode via ultrasonic welding. The copper-containing member faced the positive electrode current collecting tab through the separator. The composition of the negative electrode lead was changed to that shown in Table 1. Except for the above, a nonaqueous electrolyte battery was produced in the same manner as in Example 1.

Example 9

As the copper-containing member, a copper alloy foil having a thickness of 50 μm, a width of 90 mm, and a height of 80 mm and having a composition shown in Table 1 below was prepared. The composition of the negative electrode lead was changed to that shown in Table 1. Except for the above, a nonaqueous electrolyte battery was produced in the same manner as in Example 8.

Comparative Examples 1 to 3

Nonaqueous electrolyte secondary batteries having the same structure as in Example 1 described above were produced except that the copper-containing member was not provided, and the compositions of the negative electrode lead, the negative electrode current collector, and the negative electrode active material are changed to those shown in Table 1 below.

As for the obtained nonaqueous electrolyte secondary batteries from Examples 1 to 9 and Comparative Examples 1 to 3, an internal resistance of the battery and a cell temperature in an over-discharge test were measured in conditions as explained below, and the results are shown in Table 2 below.

The evaluation of the internal resistance of the battery was performed in an atmosphere of a humidity of 90% and a temperature of 25° C. As for the batteries from Examples 1 to 9 and Comparative Examples 1 and 2, discharge and charge was repeated in which charge was performed at a constant current of 20 A, subsequently charge was performed at a constant voltage of 2.7 V (the maximum current of 20 A) for 60 minutes, and then discharge was performed at a constant current of 20 A up to a discharge final voltage of 1.5 V. An internal resistance of the battery was measured at the time when the discharge capacity reached half the value of the first cycle discharge capacity. As for Comparative Example 3, discharge and charge was repeated in which charge was performed at a constant current of 20 A, subsequently charge was performed at a constant voltage of 4.2 V (the maximum current of 20 Ah) for 60 minutes, and then discharge was performed at a constant current of 20 A up to a discharge final voltage of 2.7 V. An internal resistance of the battery was measured at the time when the discharge capacity reached half the value of the first cycle discharge capacity.

The evaluation conditions of the over-discharge test are explained next. The charge and discharge cycle in conditions which were the same as those when the internal resistance of the battery was measured, was repeated 3 times, and discharge was performed up to the discharge final voltage the third time, and then discharge was continued for a further 90 minutes at a 1 C rate. The maximum temperature of the battery surface was measured during the discharge.

TABLE 1

| | Composition of negative electrode lead (% by mass) | Composition of negative electrode current collector or copper-containing member (% by mass) |
|---|---|---|
| Example 1 | Cu(99.9)Sn(0.05)Zn(0.05) | Al alloy: Al(99)Mg(1) |
| Example 2 | Cu(99.9)Sn(0.05)Zn(0.05) | Al alloy: Al (99.5)Mg(0.5) |
| Example 3 | Cu alloy: Cu(99)Sn(0.5)Zn(0.5) | Al alloy: Al(99)Mg(0.5)Mn(0.5) |
| Example 4 | Cu alloy: Cu(99.9)Sn(0.05)Zn(0.05) | Al(99.9)Mg(0.1) |
| Example 5 | Cu alloy: Cu(99)Sn(0.5)Zn(0.5) | Al alloy: Al(99)Mg(0.5)Mn(0.5) |
| Example 6 | Cu alloy: Cu(99)Sn(0.5)Zn(0.5) | Al alloy: Al(99)Mg(0.5)Mn(0.5) |
| Example 7 | Cu(99.9)Sn(0.05)Zn(0.05) | Al(99.9)Mg(0.1) |
| Example 8 | Al alloy: Al(99)Mg(0.5)Mn(0.5) | Current collector: Al(99.9)Mg(0.1) Copper-containing member: Cu(99.9)Sn(0.05)Zn(0.05) |
| Example 9 | Al alloy: Al(99)Mg(0.5)Mn(0.5) | Current collector: Al alloy: Al(99.5)Mg(0. 5) Copper-containing member: Cu alloy: Cu(99.5)Sn(0.25)Zn(0.25) |
| Comparative Example 1 | Al alloy: Al(99)Mg(0.5)Mn(0.5) | Al(99.9)Mg(0.1) |
| Comparative Example 2 | Al alloy: Al(99)Mg(0.5)Mn(0.5) | Al(99.9)Mg(0.1) |
| Comparative Example 3 | Al(99.5)Mg(0.5) | Al(99.9)Mg(0.1) |

TABLE 2

| | Negative electrode material | Internal resistance of battery (mΩ) | Cell temperature in an over-discharge test (° C.) |
|---|---|---|---|
| Example 1 | $Li_4Ti_5O_{12}$ | 1.0 | 40 |
| Example 2 | $Li_4Ti_5O_{12}$ | 0.8 | 35 |
| Example 3 | $Li_4Ti_5O_{12}$ | 1.2 | 45 |
| Example 4 | $Li_4Ti_5O_{12}$ | 0.7 | 32 |
| Example 5 | $Li_4Ti_5O_{12}$ | 1.5 | 48 |
| Example 6 | $TiO_2(B)$ | 1.8 | 50 |
| Example 7 | $TiO_2(B)$ | 1.3 | 47 |
| Example 8 | $Li_4Ti_5O_{12}$ | 1.5 | 35 |
| Example 9 | $Li_4Ti_5O_{12}$ | 1.5 | 30 |
| Comparative Example 1 | $Li_4Ti_5O_{12}$ | 1.5 | 100 |
| Comparative Example 2 | $TiO_2(B)$ | 1.6 | 120 |
| Comparative Example 3 | Graphite | 1.5 | 150 |

As is apparent from Table 1 and Table 2, it is found that the square nonaqueous electrolyte secondary batteries from Examples 1 to 9 have a lower battery temperature upon the over-discharge, and the reduction of the internal resistance of the battery and the reduction of temperature increase upon the over-discharge are more improved, comparted to those from Comparative Examples 1 to 3, while they have almost the same degree of internal resistance as those in Comparative Examples 1 to 3.

According to at least one embodiment and the nonaqueous electrolyte battery from Examples described above, a nonaqueous electrolyte battery capable of suppressing a temperature increase upon over-discharge and of realizing high safety even if the circuit for preventing the over-discharge can be provided, because the battery includes the copper-containing member which is electrically connected to the negative electrode current collector to be able to prevent from or control over-discharge and is formed of copper or a copper alloy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a positive electrode,
a negative electrode comprising a negative electrode current collector comprising aluminum or an aluminum alloy and a negative electrode active material-containing layer formed on the negative electrode current collector,
a separator provided between the positive electrode and the negative electrode,
a copper-containing member which contains a copper alloy, and is electrically connected to the negative electrode current collector to prevent from over-discharge and
a nonaqueous electrolyte, and
wherein the copper alloy comprises at least one of an alloy comprising at least one element selected from the group consisting of Fe, Si, Cr, Sn, Zr, Zn, Pb and Bi in a content of 0.7% by mass or less, and an alloy comprising a metal capable of electrically dissolved at a potential of 3.5 V (vs. $Li/Li^+$) or more relative to a lithium potential.

2. The nonaqueous electrolyte battery according to claim 1, wherein the copper-containing member is provided so as to face the positive electrode through the separator.

3. The nonaqueous electrolyte battery according to claim 1, which further comprises a negative electrode terminal electrically connected to the negative electrode, and the copper-containing member serves as a lead which electrically connects the negative electrode current collector to the negative electrode terminal.

4. The nonaqueous electrolyte battery according to claim 1, wherein the negative electrode active material-containing layer comprises a metal oxide comprising titanium.

5. The nonaqueous electrolyte battery according to claim 4, wherein the metal oxide comprises at least one selected from the group consisting of $Li_aTiO_2$ (0≤a≤2), a titanium oxide having a monoclinic system, a titanium oxide having a bronze structure (B), a titanium oxide having an anatase structure, a lithium titanium oxide having a spinel structure, a lithium titanium oxide having a ramsdellite structure, $Li_{1+b}Ti_2O_4$ (0≤b≤1), $Li_{1.1+b}Ti_{1.8}O_4$ (0≤b≤1), $Li_{1.07+b}Ti_{1.86}O_4$ (0≤b≤1), $Li_cNb_dTiO_7$ (0≤c≤5, and 1≤d≤4) and lithium titanium-containing composite oxide containing at least one element selected from the group consisting of Nb, Mo, W, P, V, Sn, Cu, Ni and Fe.

6. The nonaqueous electrolyte battery according to claim 1, wherein the copper-containing member contacts with the nonaqueous electrolyte.

7. The nonaqueous electrolyte battery according to claim 1, wherein the copper alloy has a Cu purity of 99% by mass or more.

8. The nonaqueous electrolyte battery according to claim 1, wherein the positive electrode comprises at least one selected from the group consisting of lithium manganese composite oxides, lithium nickel composite oxides, lithium cobalt composite oxides, lithium nickel cobalt composite oxides, spinel type lithium manganese nickel composite oxides, lithium manganese cobalt composite oxides, fluorosulfates containing lithium and iron, and lithium nickel cobalt manganese composite oxides having a layered crystal structure.

9. A battery pack comprising the nonaqueous electrolyte battery according to claim 1.

* * * * *